United States Patent
Baughman et al.

(10) Patent No.: US 11,500,905 B2
(45) Date of Patent: Nov. 15, 2022

(54) PROBABILITY MAPPING MODEL FOR LOCATION OF NATURAL RESOURCES

(71) Applicant: KYNDRYL, INC., New York, NY (US)

(72) Inventors: Aaron K. Baughman, Silver Spring, MD (US); Thomas B. Harrison, Holly Springs, NC (US); Brian M. O'Connell, Cary, NC (US)

(73) Assignee: KYNDRYL, INC., New York, NY (US)

( * ) Notice: Subject to any disclaimer, the term of this patent is extended or adjusted under 35 U.S.C. 154(b) by 778 days.

(21) Appl. No.: 16/397,186

(22) Filed: Apr. 29, 2019

(65) Prior Publication Data
US 2019/0258647 A1 Aug. 22, 2019

Related U.S. Application Data (63) Continuation of application No. 14/278,433, filed on May 15, 2014, now Pat. No. 10,318,552.

(51) Int. Cl.
*G06N 7/00* (2006.01)
*G06F 16/28* (2019.01)
(Continued)

(52) U.S. Cl.
CPC ............ *G06F 16/285* (2019.01); *G06F 16/00* (2019.01); *G06N 7/005* (2013.01); *G06N 20/00* (2019.01); *G06N 20/20* (2019.01)

(58) Field of Classification Search
None
See application file for complete search history.

(56) References Cited

U.S. PATENT DOCUMENTS 7,096,154 B1 8/2006 Andrade-Cetto
7,599,898 B2 10/2009 Tesauro et al.
(Continued)

FOREIGN PATENT DOCUMENTS

WO 2010015808 A1 2/2010
WO 2011084149 A1 7/2011
(Continued)

OTHER PUBLICATIONS

"Environmental Assessment Criteria to be Taken into Consideration for Selection of Locations of Petroleum Projects", An IP.com Prior Art Database Technical Disclosure, IPCOM000219892D, Jul. 17, 2012.

(Continued)

*Primary Examiner* — David R Vincent
(74) *Attorney, Agent, or Firm* — Erik Swanson; Andrew D. Wright; Calderon Safran & Cole P.C.

(57) ABSTRACT

A computer processor generates a topic-based dataset based on parsing content received from a plurality of information sources, which includes historical data and scientific data, associated with a location of a natural resource. The processor generates a plurality of clusters, respectively corresponding to like-topic data of the topic-based dataset. The processor determines a plurality of hypotheses, respectively corresponding to the plurality of clusters of the like-topic data, wherein the plurality of hypotheses are based on features associated with each of the plurality of clusters of the like-topic data. The processor combines pairs of clusters, based on a similarity heuristic applied to the one or more pairs of clusters, and the processor determines a plurality of probabilities respectively corresponding to a validity of each hypothesis of the plurality of hypotheses, associated with the location of a natural resource.

20 Claims, 4 Drawing Sheets

(51) Int. Cl.
*G06N 20/00* (2019.01)
*G06F 16/00* (2019.01)
*G06N 20/20* (2019.01)

(56) References Cited

U.S. PATENT DOCUMENTS

| | | |
|---|---|---|
| 7,607,083 B2 | 10/2009 | Gong et al. |
| 8,635,172 B1 | 1/2014 | Buryak et al. |
| 8,898,148 B1 | 11/2014 | Yagnik et al. |
| 9,135,242 B1 | 9/2015 | Wang et al. |
| 9,195,370 B1 | 11/2015 | Hlatky, Jr. et al. |
| 2006/0026152 A1 | 2/2006 | Zeng et al. |
| 2007/0255666 A1 | 11/2007 | Sanfilippo et al. |
| 2009/0313192 A1 | 12/2009 | Baughman |
| 2011/0163733 A1 | 7/2011 | Nelson, Jr. et al. |
| 2011/0264649 A1 | 10/2011 | Hsiao et al. |
| 2013/0024414 A1 | 1/2013 | Herzog |
| 2014/0201126 A1* | 7/2014 | Zadeh .................. A61B 5/165 706/52 |

FOREIGN PATENT DOCUMENTS

| | | |
|---|---|---|
| WO | 2012009330 A1 | 1/2012 |
| WO | 2012045496 A2 | 4/2012 |

OTHER PUBLICATIONS

"On Clustering Validation Techniques", Maria Halkidi, Yannis Batistakis, Michalis Vazirgiannis, Journal of Intelligent Information Systems, 17, 2-3, 2001, pp. 107-145.

"An evaluation of criteria for measuring the quality of clusters" Raskutti, Bhavani, and Christopher Leckie, Ijcai. Jul. 1999, pp. 905-910.

"TopCat: Data Mining for Topic Identification in a Text Corpus", Chris Clifton, Robert Cooley, PKDD 1999, LNAI 1704, pp. 174-183.

U.S. Appl. No. 14/278,433, filed May 15, 2014.

List of IBM Patents or Patent Applications Treated as Related, Appendix P, Filed Herewith, 2 pages.

* cited by examiner

PROBABILITY MAPPING MODEL FOR LOCATION OF NATURAL RESOURCES

FIELD OF THE INVENTION

The present invention relates generally to the field of data analytics, and more particularly to probability mapping of natural resource locations.

BACKGROUND OF THE INVENTION

Supply chains for natural resources require perpetual search and discovery for sources to meet a growing demand. Discovery of sources of natural resources can benefit by improving the precision of exact locations, reducing the cost and time required to acquire natural resources, such as food sources, energy-producing materials, building materials, minerals, metals, and rare elements.

New sources of natural resources are needed to meet an ever-growing demand from higher consumption of both developed and developing countries. The accuracy and productivity of finding natural resource source locations can greatly benefit supply chain components of businesses by lowering costs of discovery, reducing collateral impact to non-targeted resources.

SUMMARY

Embodiments of the present invention disclose a method, computer program product, and system for locating natural resources. A computer processor generates a topic-based dataset based on parsing content received from a plurality of information sources, wherein the plurality of information sources includes historical data and scientific data, both of which are associated with a location of a natural resource. The computer processor generates a plurality of clusters respectively corresponding to like-topic data of the topic-based dataset from the plurality of information sources. The computer processor determines a plurality of hypotheses, respectively corresponding to the plurality of clusters of the like-topic data, wherein the plurality of hypotheses are based on one or more features associated with each of the plurality of clusters of the like-topic data. The computer processor combines one or more pairs of clusters of the plurality of clusters based, at least in part, on a similarity heuristic applied to the one or more pairs of clusters, and the computer processor determines a plurality of probabilities respectively corresponding to a validity of each hypothesis of the plurality of hypotheses, associated with the location of a natural resource.

DETAILED DESCRIPTION

Decision making techniques and processes are used to target location areas for resource extraction, anticipating a higher likelihood of locating sources or larger quantities as a result of the decision making. Techniques and processes may rely on the experience of previous success, or make use of scientific discoveries or relationships. In some instances real-time data from instruments may be used to determine locations most likely to include quantities of sought-after natural resources. Large quantities of information and data may exist, which may be pertinent to discovering or improving the accuracy of locating natural resources; however, effective and meaningful ways of using multiple sources and vast quantities of data that may be available for improved decision making of natural resource location has been elusive.

Embodiments of the present invention recognize that improving the time required to locate natural resources and bring them to market improves efficiency and lowers costs. Additionally improving the confidence in the natural resource discovery process may help protect other non-targeted resources by focusing discovery efforts in more potentially productive areas.

Some embodiments of the present invention process information from sources of content, which is received as a dataset and includes: text, graphs, charts, data, and images of historical information, hereafter referred to as "historical data", and text, graphs, charts, data, and images of scientific information, hereafter referred to as "scientific data". Historical data may also include content from logs, content from blogs, content from posts and other Internet-based online sources. The sources of content also include real-time data from instruments, and sensors, as well as multimedia content, which may include images, presentations, graphics, audio, and video. The information processing includes parsing large amounts of content included in the dataset, generating topic-based data, summarizing the data, correlating and determining relationships, and creating clusters of like-topic content based on a heuristic. Some embodiments of the present invention extract features of the clusters to produce feature vectors, which are stored in a proximity matrix, to which a proximity algorithm is applied to further determine similarity of clusters to combine. Similar clusters are aggregated, and the corresponding hypotheses associated with the aggregated clusters are combined.

The proximity matrix is used to develop models which are trained and further optimized by supervised learning techniques. The models determine a confidence level or probability associated with the validity of one or more hypotheses regarding a location of acquiring or determining a specified natural resource. The confidence level or probability may be used to generate a real time probability heat map that would allow users to make faster and more accurate decisions and/or confirm their experience based assessments. The heat map visually displays various levels of probability of hypothesis, depicting the difference in probabilities by different colors, shading, or other representative distinctions. As real-time streaming data changes, the user will have the ability to recognize the change through real-time visualization updates, and react accordingly.

The proposed invention may be best understood through an example. In Alaska alone, the export value for fish caught commercially (salmon, general fish, crab . . . ) is around $2.2B annually (source: Alaska Office of Fisheries). Couple this with a growing food demand worldwide, mostly in growth markets, a rising cost of operations, environmental threats, and a need for sustainability, there is an opportunity to help improve the ability for commercial fisheries to "hunt" smarter, protecting large export opportunities to these growth markets.

Current fisheries may use limited sources of information to target their source product (fish, crab, shrimp, etc.), these sources include general experience (gut feel) and historical logs of previous fishing trips. Embodiments of the present invention ingest, analyze, summarize, correlate, and cluster potentially large amounts of data which includes scientific data on fish behavior, current technology such as depth finders, sonar, global positioning system (GPS) locations, weather radars, and social media (talking with others in their trade). The data/information from the sources are used to build a model that produces a heat map visualization of probabilities associated with the location of natural resources. Applying an embodiment of the present invention to a large scale commercial fishing outfit, for example, looking to trawl for halibut, the captain of the fishing trawler may utilize a real time probability heat map that visually depicts the probabilities of where the largest schools of fish are located, produced through the analytical computation of multiple data structures. Embodiments of the present invention make use of one or more analytical engines to process large amounts of data from multiple sources and produce output that may ultimately be used to render the probability of a hypothesis or answer to a question, visually, for example as a heat map of the probability of locating the targeted schools of halibut. Producing the heat map may help the captain make more informed decisions. More informed decisions lead to improved productivity, as in more fish harvested at less cost, locating the fish faster, which uses less fuel, and reducing labor down time, which may be a high cost driver when searching for fish.

The commercial fishermen have the knowledge of, most scientific journals written, historical production baselines, and real-time data feeds from multiple sources, at their fingertips, helping them produce improved outcomes through the use of a real-time probability heat map, which is produced through decision making based on probabilities produced by an analytical machine learning mixture of models.

Embodiments of the present invention use multiple inputs of data, including historical data, real time data, and scientific data, and execute analytical operations on the data, for example, using analytical tools along with distributed processing of large data sets across clusters of computing nodes, such as using Apache Hadoop, to produce consumable outputs for use in industries that harvest natural resources that are (at times) not visible, (Note: the term(s) "Apache" and/or "Hadoop" may be subject to trademark rights in various jurisdictions throughout the world and are used here only in reference to the products or services properly denominated by the marks to the extent that such trademark rights may exist). Historical data and scientific data inputs such as logs, historical weather patterns, topic specific science data (journals, encyclopedias, theories, books, etc) may be consumed and then integrated with real time data, such as social media, sonar, current weather and weather forecasts, and detection devices (i.e. fish finder, metal detection, etc.), to deduce decision making down to outcomes that are highly probable.

The multiple sources of data are conglomerated to produce two primary sources of raw data; a historical data store that is kept relevant through periodic updates (as news is released, publications updated), and real time streaming of social media and real time technology. These two primary sources are then consumed by an analytical engine that parses, determines main topics, summarizes, and cross correlates topics between data sources producing probabilities of the accuracy or correctness of the data. There may be primitive engines responsible for one unit of work, and multiple primitive analytic engines may be attached to an aggregate engine that may combine or correlate the primitive results. Probability distributions of data probabilities, or beta distributions, are used to determine the more valuable, reliable, and accurate data. The summarized, and in some cases, annotated data, are extracted as like-features and included in feature vectors.

Some embodiments of the present invention store feature vectors in a proximity matrix. Similar features that include a main topic or hypothesis are combined into clusters using a heuristic such as a proximity algorithm of the feature vectors. The clustering of like-topic data and similar clusters, is an iterative activity of building and combining clusters having similar features. Combining clusters based on a similarity level continues with a scoring of each cluster space against a metric to determine a most favorable cluster space. Determining the favorable cluster space defines a threshold of when clusters are to be kept separate or combined. The result is passed to logistic regression models that use supervised learning to train the model. Dimensions of evidence, which are groups of related features, are used to determine the series of models through which the features are routed, where the output of one model may serve as the input to a next model.

The trained models determine possible outcomes and probabilities associated with the outcomes, which includes a "best outcome" as a summary conclusion, and feeds the information to a heat map in real time. Computation may take place either in the compute cloud or using stand-alone applications with outputs available via web applications or hand held device applications. The result is then used to make real time decisions/adjustments.

Using an exemplary embodiment and keeping with the previously discussed example theme, suppose a fleet of king crab fishermen are setting off for a 3 month fishing season. The fishermen would feed the natural resource locator system all the related historical information (logs, weather, scientific data, etc) then begin streaming real time information (current and forecasted weather, water temperature, water currents, water clarity, sonar data, detection data, social chatter), the system would then process this information, taking a look at the locations in which the crab have been during historical seasons, comparing current weather and current water conditions to historical weather and water conditions, and hypothesize how the crab may behave (scientific data) as the weather and water conditions change over the next few hours or days. The output will then overlay a global positioning system (GPS) map providing the captain the highest location probability to catch crab currently and over the next few days as the crab move or are influenced by real time natural conditions.

In some embodiments of the present invention, based on natural resource ontology, a natural resource topic or hypotheses may be received from user input and/or determined based on input from data sources. An ontology can be viewed as being a formal representation of knowledge of a set of concepts and their relationship within a particular domain. Ontologies are the structural frameworks for organizing information and are used as a form of knowledge representation or categorization of some part of the world. Ontologies can also be thought of as machine-interpretable dictionaries, as they provide formal definitions for domain concepts. Machine-interpretable means that a computer can make inferences about the relationships among subject matter. Knowledge representation consist of two parts: (1) creating data structures that represent what we know about a problem or domain, and (2) defining inference operations that can automatically analyze these data structures to draw new conclusions. Ontologies are one approach to knowledge representation in which data structures are created that define categories and relationships among concepts in a domain and in which ontology analysis can process these data structures to draw additional conclusions about concept relationships.

Natural language processing (NLP) may be applied to text and/or document-based data, and may include use of Word-Net, VerbNet, for example, and other text content and context recognition tools (Note: The terms "WordNet" and "VerbNet" may be subject to trademark rights in various jurisdictions throughout the world and are used here only in reference to the products or services properly denominated by the marks to the extent that such trademarks exist). An NLP pipeline can be applied that extracts features such as, named entities, parts of speech, focus of sentences and paragraphs, anaphora resolution, content relationships, relevancy measures of content, and performs numerical normalization.

Some embodiments of the present invention cluster like-topic documents and content sources together, based on use of a proximity matrix that can be measured using any heuristic. A proximity matrix serves as a container of information reflective of the similarity of the topics of the content sources, and singular value decomposition techniques are applied to filter-out content to reveal the main topics of the text documents and text content.

For other data types, such as images or multimedia, object recognition algorithms may be used to identify objects, orientations and object relationships, within images and video, and image metadata may be parsed and analyzed to identify specific details, location and qualities of objects within the image. Audio-based data may be processed through acoustic signature detection algorithms for content analysis and recognition, and text metadata associated with multimedia content may be parsed and used to more fully determine and categorize multimedia content. Data that has been processed through recognition algorithms and parsed, are clustered based on similarity of topic and/or content by use of a proximity matrix that can be measured by using any heuristic applicable to the data type.

Agglomerative clustering may be used on topics determined from textual data, whereas multimedia data topics are extracted during feature extraction. All topics can be mapped to a topology, which is a mathematical study of shapes and spaces that includes properties of connectedness, continuity, and boundary, so that the data topics can be represented within the same mutual perspective and the different topics obtained from text and multimedia can be correlated to each other.

The historical corpora may include accumulated trends and may include knowledge bases which are used to perform statistical analysis and hypothesis testing. Building the corpora and knowledge bases includes use of a topology model and/or n-gram relations. N-gram relations examine two or more words within text and any number of words between them to determine if there is a relationship. Typically a binary value is assigned which indicates if the words are related or not, and the additional words between them are scored if they are also related. For large amounts of text-based topics and information, this summarizes topics and significant characteristics, filtering out non-related text. Additional historic data, such as the latitude and longitude or geospatial location associated with events, as well as historical weather, weather patterns over a period of time, and climate conditions from analyzed radar information, may be included in the compilation of a historic knowledge base. The data is normalized into numerical representations, which can be used as data descriptors and applied to numerical and statistical functions to produce a prediction represented by a probability.

In some embodiments of the present invention, custom annotators are applied to historical corpora to produce features, by describing images, objects, scientific facts, and relationships. Annotation of elements of the large volume of historical data results in a plurality of features, which are accumulated in a matrix of features and serve as dimensions of evidence. For example, a number of text, relationships, and images are custom annotated and result in 1000 annotations. The 1000 annotations are features placed in a storage mechanism (a matrix) and the features can be grouped depending on topics. The groupings of like-topic features serve as a dimension of evidence. Dimensions of evidence are used as routes, defining a sequence of multiple models (logistic regression models) through which the evidence and corresponding hypotheses are processed, and the sequence of multiple models, when trained, serve as a "mixture of experts". By successive refinement, based on the data applied to the models, the multiple models are trained. The supervised learning algorithm is applied to the models to best learn how to combine deep evidence using a probability density function, in which all the features directed to a model are combined to result in a probability aligning with the particular subject determination of the model. Each model within a route of multiple models is a probability density function. The trained models determine and apply confidence values to the plurality of candidate hypotheses or topics from the features of the proximity matrix, and the confidence values or probabilities of the candidate hypotheses can be reported. A report can be produced that includes the top "N" candidate hypotheses, based on the determined probabilities and/or confidence values of the hypotheses, where "N" can be a user set number. The dimensions of evidence and features used in support of the probabilities of the hypotheses can be traced back to the images and text content sources on which they are based.

In determining the value, accuracy and reliability of features from source data, the confidence level of a distribution of distributions, or the beta distribution, is used. For example, what is the probability that the weather component of input data will have the correct weather probability? The alpha and beta parameters in the case of weather probability, can provide the average amount of times the weather probability is accurate. If the predicted probability is accurate 200 times out of 300 forecasts, it can be concluded that the probability of an accurate weather forecast probability is 67%, as depicted in equation (1), $$\frac{\alpha}{\alpha+\beta} = P \frac{200}{200+100} = 0.667 \quad (1)$$

where α is the number of correct forecasts, β is number of inaccurate forecasts and P is the probability of a forecast probability being accurate.

With a weather prediction of a 40% chance of rain, with this distribution, the confidence of the forecast being accurate is approximately 27% or dbeta (0.4, 200, 300). As the number of samples for beta and alpha increase, the confidence will increase. Determining the confidence of a distribution of distributions uses the beta distribution, which is depicted in general form in equation set (2).

$$f(x;\alpha,\beta) = \frac{\Gamma(\alpha+\beta)}{\Gamma(\alpha)\Gamma(\beta)} x^{\alpha-1}(1-x)^{\beta-1} \quad (2)$$

$$= \frac{1}{B(\alpha,\beta)} x^{\alpha-1}(1-x)^{\beta-1}$$

$$\hat{\alpha} = \bar{x}\left(\frac{\bar{x}(1-\bar{x})}{\bar{v}} - 1\right), \text{ conditional on } \bar{v} < \bar{x}(1-\bar{x}),$$

$$\hat{\beta} = (1-\bar{x})\left(\frac{\bar{x}(1-\bar{x})}{\bar{v}} - 1\right), \text{ conditional on } \bar{v} < \bar{x}(1-\bar{x}).$$

The output of the beta distributions are the prior probabilities. The prior probabilities decorate the feature vectors of each type of input data, and are meant to attribute uncertainty rather than randomness to the uncertain quantity. If there are multiple data sources, for example, multiple sources of weather pattern predictions, the beta distribution probability is used to combine each weather pattern or the probability is used to choose the most confident feature.

In some embodiments of the present invention, each of the data sources are sent to feature extraction modules which are combined with a non-linear probability function, such as a logistic regression, and a deep learning algorithm.

Each of the data sources are sent to feature extraction modules and, in one embodiment, are combined with a non-linear probability function such as a linear logistic regression and a deep learning algorithm, as generally depicted in equation set (3). In other embodiments, other regression algorithms and techniques may be used, and depiction of equation set (3) is for exemplary purposes and embodiments of the present invention are not limited by the regression technique used in training the models.

$$\bar{v}_r \cap \bar{v}_d = \bar{v}_a \quad (3)$$

$$f(x) = \frac{1}{1+e^{-(wx+b)}}$$

$$\bar{v}_a = v_1 w_1 + v_2 w_2 + \ldots + v_{|v_a|} w_{|v_a|} + b$$

The output from the deep learning algorithm and logistic regression are averaged together for a final answer as to whether a natural resource is present. For each type of natural resource, a support vector machine contains an ensemble technique of deep learning and logistic regression, in effect defining a route of feature vectors towards the appropriate models and identifying the best supporting feature vectors, and separating the features to be classified. Ensemble techniques use a sequence of multiple models or "mixed experts", to obtain better predictive inference performance, predicting future observations based on historical observations and real-time data, producing better results in combination than could be obtained from any of the constituent models alone. A machine learning ensemble refers to a particular set of alternative models that may be applied in a sequence, but typically allows for much more flexible structure to exist between those alternatives.

Supervised learning algorithms perform the task of searching through a hypothesis space to find a suitable hypothesis that will make good predictions with a particular problem. Even if the hypothesis space contains hypotheses that are very well-suited for a particular problem, determining a single hypothesis that adequately predicts results may be very difficult. Ensembles combine multiple hypotheses to form a better hypothesis. In other words, an ensemble is a technique for combining many weaker learners, or models, in an attempt to produce a strong learner. The term ensemble is usually reserved for techniques that generate multiple hypotheses using the same base learner. The broader term of multiple classifier systems also covers hybridization of hypotheses that are not induced by the same base learner.

Figure 1:
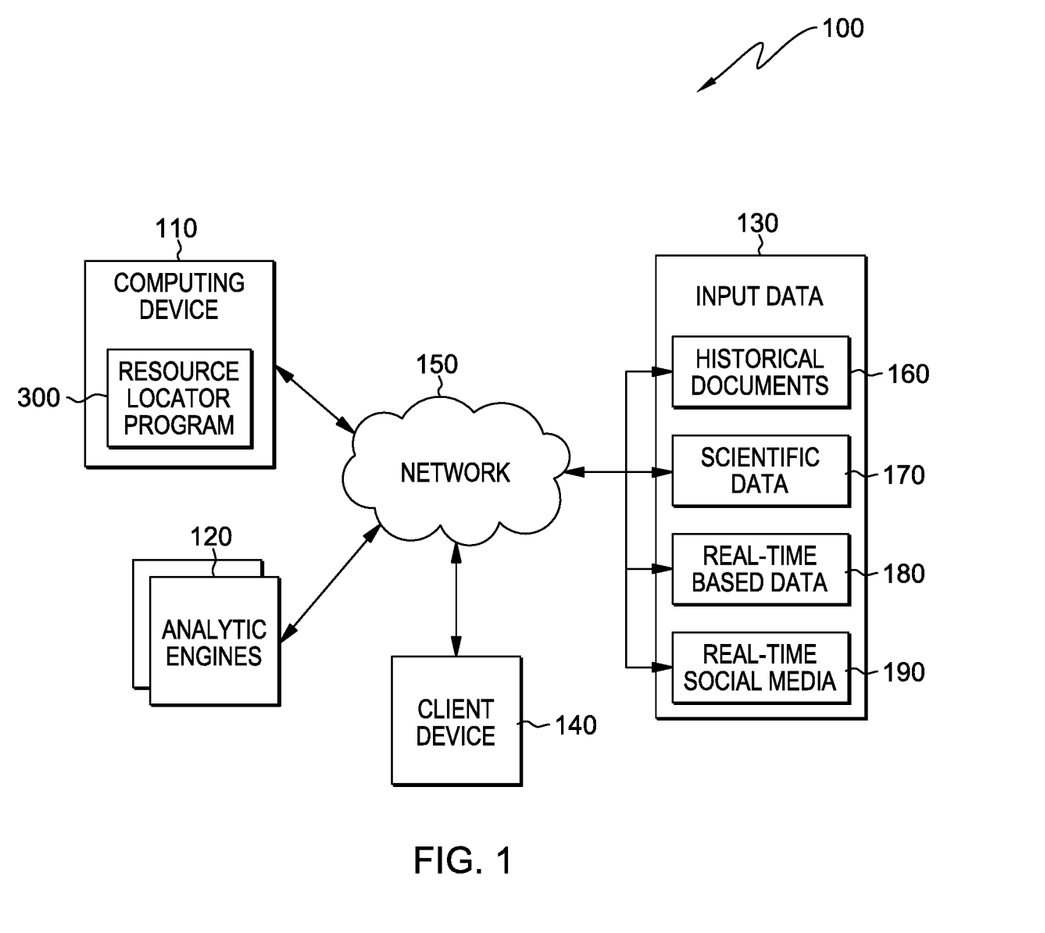
FIG. 1 is a functional block diagram illustrating a distributed data processing environment, in accordance with an embodiment of the present invention.

The present invention will now be described in detail with reference to the Figures. FIG. 1 is a functional block diagram illustrating a distributed data processing environment, generally designated 100, in accordance with one embodiment of the present invention. Distributed data modeling environment 100 includes computing device 110, analytic engines 120, input data 130, and network 150.

Network 150 can be, for example, a local area network (LAN), a wide area network (WAN), such as the Internet, or a combination of the two, and can include wired or wireless connections. Network 150 can be a communication fabric within or between computer processors, such as a PCIe bus. In general, network 150 can be any combination of connections and protocols that will support communications via various channels between computing device 110, input data 130 and analytic engines 120, as well as various components and devices associated with computing device 110, within distributed data processing environment 100, in accordance with an embodiment of the present invention.

Input data 130 includes a variety of data sources used as information input to embodiments of the present invention. The data sources of input data 130 may include, but are not limited to databases, libraries, journals, blogs, logs, articles, or any collection of data that can be used by embodiments of the present invention to determine the probability and/or confidence in the location of a designated natural resource. Input data 130 may include both static and dynamic data sources and may be updated such that in time, current dynamic data becomes included in historical data. Input 130 is depicted as including historical documents 160, scientific data 170, real-time based data 180, and real-time social media 190. One of ordinary skill in the art will recognize that the depicted data sources represent the historical and real-time aspect of data sources and are not meant to limit the sources of data that may be included in embodiments of the present invention.

Historical documents 160 include published data of information that is primarily stable or static. Historical documents 160 may be accessible via direct access or network access, and predominately includes text-based data, although images, maps, illustrations, graphs, and graphics, may also be included in publications. For example, historic documents 160 may include published books and articles that describe a successful search for a particular natural resource, or searches that were unsuccessful. The documents may include information regarding the harvesting of a natural resource in one or more regions, suggesting that the supply may extend beyond the current region, or that the supply may be approaching exhaustion. Historical documents may include historic weather information, climate trends, and may correlate the information with aspects of natural resources. Images and other media included in historical documents 160 may include text descriptions or metadata that may aid in determining relevance and main topics of the media. In addition, historical documents 160 may include multimedia content, such as audio and video recordings, presentations, and logged information.

Scientific data 170 includes documents and other media forms that contain information supported by tested hypothesis, or factual data obtained by measurement or observation. Scientific data 170 may include important relationships and correlations determined from data measurement and analysis. For example, scientific data may be published regarding geological findings associated with a particular region. The published findings may include a plurality of documents with published facts, tested theories, projections, and modifications to previous findings. Scientific data 170 may further include images, graphs, and illustrations representing large sums of data and may further represent the relationships between various types of distinct data.

Real-time based data 180 includes the current collection of data from measurement devices, instruments, tools, and real-time recording of observation. Real-time based data 180 includes a large variety of data that can be applied to embodiments of the present invention to determine high probability candidate hypotheses directed towards locating a natural resource. Examples of real-time based data 180 include, but are not limited to, imaged displays of sonar or radar devices, measurement of temperatures, humidity, density, velocity, vibration frequency, direction, current weather data, weather predictions, etc. . . . .

Real-time social media 190 includes sources of real-time communication that are available. Real-time social media 190 captures current empirical data that may be found, for example, from current blog postings, short messaging service (SMS) messages, radio or television broadcasts, tweets, Facebook posts, and other communication sources. Inclusion of real-time data sources includes a dynamic element in the determination of probabilities of various candidate hypothesis associated with locating a natural resource.

Some embodiments of the present invention enable the location of naturally occurring resources not readily visible, by determining a probability and/or a confidence level of a natural resource being found at a particular location or within a specified region. Examples of natural resources include, but are not limited to, oil, coal, natural gas, metals, precious metals, minerals, vegetative growing conditions, food supplies (e.g. fish, shellfish), and aquifers.

Analytic engines 120 includes techniques to parse and analyze data content to determine dominant topics, relationships, relevance, and summarizations of content that can be used in machine learning activity towards producing a desired result. An analytic engine may be used that employs text analytics, which determines patterns, structure, relevance, and interpretation of input text. In some embodiments, the analytic engine may also include use of natural language processing (NLP), which is based on machine learning and use of statistical techniques to derive a probability of the meaning of a natural language input.

Natural language processing may be combined with semantic analysis, which is the task of building structures that approximate concepts, from a large collection of text-based data, and/or may further be combined with sentiment analysis, which is the identification and extraction of subjective information in source materials. Semantic analysis may include techniques that determine parts of speech and relate syntactic structure of phrases and sentences of the input content, to their meanings.

In the case of input data including audio input, an analytic engine may include speech recognition techniques to determine the content of the digitized audio submission and further analyze the determined content with techniques used for text, to determine potential content impact. Audio input may be received in formats such as, WAV, WMA, MP3, Au, AIFF, and ALAC, for example.

An analytic engine for image analysis may extract information from images using digital image processing techniques, which may include, but are not limited to, object recognition, pattern recognition, digital geometry, and digital signal processing. For example, an image may depict a series of elevated hills aligning the sides of a lake and may also depict trees and other vegetation that may be recognizable and determine the geographical location of the image. Text may be extracted directly from an image (e.g., the text written on a sign within the image), or may be extracted from metadata associated with the image, and an analysis may be performed on the image-associated textual data. Image input may be received in formats such as graphics interchange format (GIF), joint photographic experts group (JPEG), bitmap (BMP), or portable network graphics (PNG), for example. Video content may be analyzed using image analysis techniques for each video frame as well as motion detection techniques. Video analysis includes determining a codec, which is an abbreviation for "compression/decompression" of the digital content. A codec encodes video into a stream of bytes and containers, which describe the structure of the video file, and is identified by a file extension, such as .AVI, .MP4, or .MOV, for example.

Computing device 110 may be a laptop computer, tablet computer, netbook computer, personal computer (PC), a desktop computer, a personal digital assistant (PDA), a smart phone, or any programmable electronic device capable of communicating via network 150, with various components and other devices within distributed database environment 100 (not shown).

Computing device 110 has access to input data 130 and analytic engines 120. In one embodiment of the present invention, computing device 110 may have direct access to some or all of the data sources of input data 130, or, in another embodiment, computing device 110 may access one or more sources of input data 130 via network 150. Similarly, in one embodiment computing device 110 may have direct access to analytic engines 120, for example, if analytic engines 120 was stored and operated within components of computing device 110 (not shown). Alternatively, in another embodiment, computing device 110 may access analytic engines 120 via network 150. Computing device 110 operates resource locator program 300, which may be stored on computing device 110, as depicted in FIG. 1, or alternatively, may be accessible by computing device 110 via network 150. Computing device 110 may include internal and external hardware components, as depicted and described in further detail with respect to FIG. 4.

Resource locator program 300 performs operations on received input data and produces an output indicating the likelihood of natural resources being found at a location identified by a topic or hypothesis. In one embodiment of the present invention, the input data may be accessed by resource locator program 300 from known sources or an aggregation of sources of data. In other embodiments the input data may be transmitted to resource locator program 300, where it is received, and may be in response to a communicated request to transmit the input data. The input data includes historical documents 160, which may be a large text-based corpus of published documents, articles, discussions, historic measurements, historic weather, and commentary. The input data may also contain historic multimedia data, including images, video, and audio content, as well as scientific data 170, which includes results of experiments and tests, established facts and relationships, theories and hypotheses, as well as the evidence that supports or refutes the theories and/or hypotheses.

Resource locator program 300 also receives real-time based data 180 and real-time social media 190 as input data. The real-time input data includes appropriate sensor, instrument, and measurement data that is be fed and received within a brief transmission timeframe after the data is detected. Real-time based data 180 provides the most current information associated with the input data used by resource location program 300, and is used in association with real time social media 190 to complete a current set of conditions related to one or more locations with respect to a designated natural resource. Real-time social media 190 includes multiple types of communications that may be associated with current conditions of a designated natural resource. For example, real-time social media 190 may include short message service (SMS) messages, emails, blog postings, or other shared content that may describe or comment on one or more conditions associated with the search for or extraction of a natural resource.

Resource locator program 300 receives the real-time input data, the historical data, and scientific input data, and performs analysis on the data to filter, determine relevance, correlate, and consolidate data. In one embodiment of the present invention, resource locator program 300 includes modules that perform analytic engine analysis and computations on the input data, whereas in another embodiment, resource locator program 300 may transmit the data to one or more accessible analytic engines to perform analysis and computations on the input data, returning the analyzed data to resource locator program 300 in usable form. The input data are clustered in like-topic groupings and used in creating models that are trained and may be combined to determine the probability or confidence levels associated with finding the identified natural resource at a given location, or in other embodiments, may indicate one or more location areas with the highest probability of finding a designated natural resource.

Resource locator program 300 operates based on a "seed" hypothesis, related to one or more natural resource topics. In one embodiment of the present invention, resource locator program 300 receives a user-input hypothesis regarding a natural resource specified by the user. The topic of the hypothesis identifies a specific natural resource to be located, and may further include information correlated to a specific location, area, or region to which the hypothesis may apply. In other embodiments, resource locator program 300 may receive an input query or topic that serves to seed the generation of one or more hypotheses based on the analysis, correlation, and clustering of source data. The corresponding evidence supporting hypotheses are applied to a model which assigns a probability of the hypothesis with respect to the natural resource. Resource locator program operates to determine the probabilities of various hypotheses based on the input data received that support the hypotheses, logistic regression modeling, and supervised learning techniques.

Resource locator program 300 performs activities that produce dimensions of evidence associated with the topic or hypothesis that results in determining a probability or confidence level supporting the hypothesis or topic. In cases where an area or region is identified within a hypothesis or topic, a plurality of probabilities may be produced that correspond to different points within the area or region in which the probability of finding the designated natural resource may vary.

Resource locator program 300 may include one or more models, referred to as an ensemble or mixture of models, used for natural resource location. The models are trained by use of clustering techniques applied to the analytic engine output, defining a best cluster space, and logistic regression supervised learning techniques, producing a model output that predicts the probability of finding a natural resource at a designated location, with acceptable accuracy. Training of resource locator program 300 includes, but may not be limited to, providing a hypothesis of natural resource location with answers of the associated input data known to be associated with the discovery of the natural resource at the designated location. The techniques are refined by continuously updating and considering new input data, training with hypothesis for which the answers are known, and iterations with appropriate adjustments of the model to minimize error and maximize probabilities for known results. Once trained, resource locator program 300 is used on unknown hypotheses to determine probabilities of locating natural resources.

Figure 2:
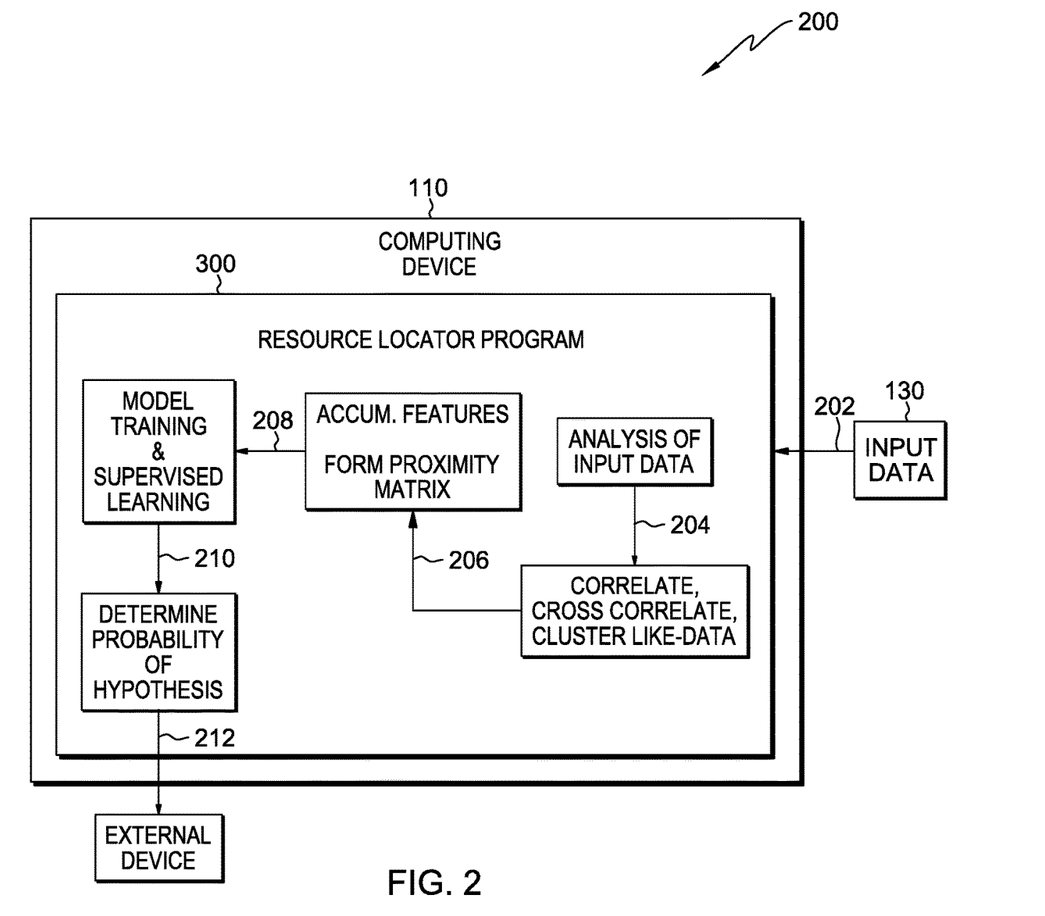
FIG. 2 is a functional block diagram depicting output flow at operational stages of resource locator program 300, in accordance with an embodiment of the present invention.

FIG. 2 is a functional block diagram depicting output flow at operational stages of resource locator program 300, in accordance with an embodiment of the present invention. FIG. 2 includes input data 130, and outputs 202, 204, 206, 208, 210, and 212, within resource locator program 300 operating on computing device 110. The outputs are illustrated as connecting to operational stages of resource locator program 300, building and training a model that produces probabilities associated with hypothesis of natural resources, for example locating a particular natural resource. In an exemplary embodiment, resource locator program 300 is used to determine a best location for a fishing vessel to find salmon in a particular part of the northern Pacific Ocean.

Input data 130 represents multiple sources of historic, static, and streaming data. Output 202 may include, but is not limited to: digitized data from books, logs, journals, scientific studies, behavior studies, weather patterns and history, images, video, social media text and/or audio, sonar, radar, temperature readings, current weather data and predictions, moon phase, and ocean current data. Output 202 feeds data to one or more analytic engines that perform analytical and selective operations on the data. The operations may include applying natural language processing (NLP) and other language resources to parse the text and determine parts of speech, named entities, determine main topics of sentences and paragraphs, anaphora resolution, and relevancy of disparate data to a query or seed topic. N-gram techniques may also be used to determine relevancy and relationship of words, sections of text, and images. Singular value decomposition (SVD) may be used in an analysis to capture principle components of the content of a document or article, and to further determine relevancy to a query topic or hypothesis.

The data output from analytic engine processing is found in output 204. The data is summarized and filtered to omit unimportant text and reduce content unrelated to the natural resource subject or query. Categorical data has been transformed to, or annotated with, numerical values used to identify topics and relevancy to other data. The numerically valued data enables statistical and computational functions to be performed on the data. Output data 204 feeds to operational steps of resource locator program 300 in which different data outputs are correlated and cross correlated, and like-data is clustered, based on a heuristic. An example of a heuristic to use in clustering is to apply a scheme of assigning numeric values to the data and using a proximity algorithm to determine Cartesian distances between data and data clusters; iteratively combining like data. Different types of data are cross-correlated, for example text data and multimedia data, to establish relevancy and relationships.

Output data 206 includes data that has been clustered into a plurality of groups that share similar topics or have common relevancy to a topic, and the common topics of the clusters form the basis of a hypothesis, which is supported by the features of clustered data. Output data 206 includes multiple clusters of like-data which may be identified by finding patterns in the data not driven by a target, which support corresponding hypotheses. The clustering is hierarchical and iterates until a best cluster space is achieved, for example, by measuring the accuracy of an experiment. Data included in output data 206 is used in resource locator program 300 operational steps that accumulate features used to form a proximity matrix. The numerated data supporting the hypothesis of a cluster are extracted as features and the different features are represented as feature vectors and stored in the proximity matrix.

Output 208 includes proximity matrices, which are trained using unsupervised learning, in which the threshold of cluster aggregation and separation is determined. The data of output 208 is applied to similarity or proximity algorithms to determine how similar clusters are to each other. Output 208 includes feature vectors stored in a proximity matrix formed by iterative clustering of like data. Pairs of clusters are combined and a cluster may be aggregated with multiple clusters when they are found by the proximity algorithm to be similar, and the summarized concepts from combining the clusters correspond to a combined hypothesis. Similarly, clusters and corresponding hypotheses may be determined to remain separate from other clusters. Proximity scores are determined and clusters are combined or separated and the cluster space scored. This is repeated iteratively in a hierarchical approach to achieve a favorable cluster space, which may be determined by scoring the cluster space by a quality measure, inter distance to intra distance ratio of clusters, or use of a RAND index. In doing so, the threshold of combining clusters and a favorable cluster space, is determined.

The proximity matrix features are weighted initially, based on unsupervised learning results, and the features are used as input to a logistic regression model to be trained. The features of the feature vectors serve as dimensions of evidence, and are used to in determining the routes to models to be included and trained. Since multiple models are used in a hierarchical approach, the dimensions of evidence provide direction and sequence to be followed in navigating the model graph, with the output of one model serving as input to the next, until a final result is obtained.

The proximity matrix resulting in a best cluster space score is applied to supervised learning in which multiple hypotheses related to the topics and features of the proximity matrix, are submitted to the model, with the answers to the hypotheses known. Iterations of running the model include determining the error between the result of the model and the known answer for the hypothesis being run, and adjusting the coefficients of the model, or adding additional features (or both) to minimize the error. Supervised learning is iterated multiple times with the objective of closely approximating the known answers of the training hypotheses. Additional independent hypotheses with known answers are used to test the model when objective training results have been achieved. Output 210 is produced after successful training results.

Output 210 includes a trained model for locating natural resources. The natural resources enabled by the model is dependent on the data ingested by the analytic engines and the features included in the model. In one embodiment of the present invention, the resulting trained model may include multiple individual models, each determining a probability of a component of a hypothesis and providing input to another model; in effect a layering of models. In one embodiment the resulting model may be applied to finding oil reserves under low altitude land masses, for example, or in another embodiment the model may be applied to locating schools of salmon in the North Pacific Ocean. The model of output 210 is implemented in a production environment in which a hypothesis of locating a natural resource, for which output 210 was trained, is applied. The model determines the probability of the hypothesis as an outcome, based on the dimensions of evidence of features used to train the model. For example, in determining the probability of finding schools of salmon in the North Pacific, the model may consider several smaller areas and assign probabilities to each area, considering differences in historic and streaming data received.

The features included in the models are from data sources submitted to analytic engines. The data source has an associated probability, and as data is clustered and combined into feature vectors, distributions of the source data probabilities are used to establish the confidence level of the features used to develop models. Embodiments of the present invention make use of distributions of distributions (or beta distribution) of source data to predict the probability of source data probability being correct or reliable. For example, if first weather predictions source making numerous weather forecasts, is correct only twenty percent of the time, there is a lower confidence on the first weather source than a second weather source that is correct sixty percent of the time. Use of distributions of distributions indicates more accurate and reliable sources of data and improves model results.

Output 212 includes the probabilities determined by the model with respect to one or more hypotheses considered. Output 212 may be transmitted to an external device, as depicted in FIG. 2, to display the probability information in a usable context. For example, having determined the probabilities of finding schools of salmon in multiple small areas of the North Pacific Ocean, output 212 transmits the data to a screen display device on which the probabilities are represented as a heat map with shading or coloring corresponding to higher or lower probabilities of finding schools of salmon.

In one embodiment of the present invention, the display device receives transmitted data, via a network, such as network 150, from a separate computing device performing the model development and probability determinations. In another embodiment, the display device and computing device are connected in a single location.

Figure 3:
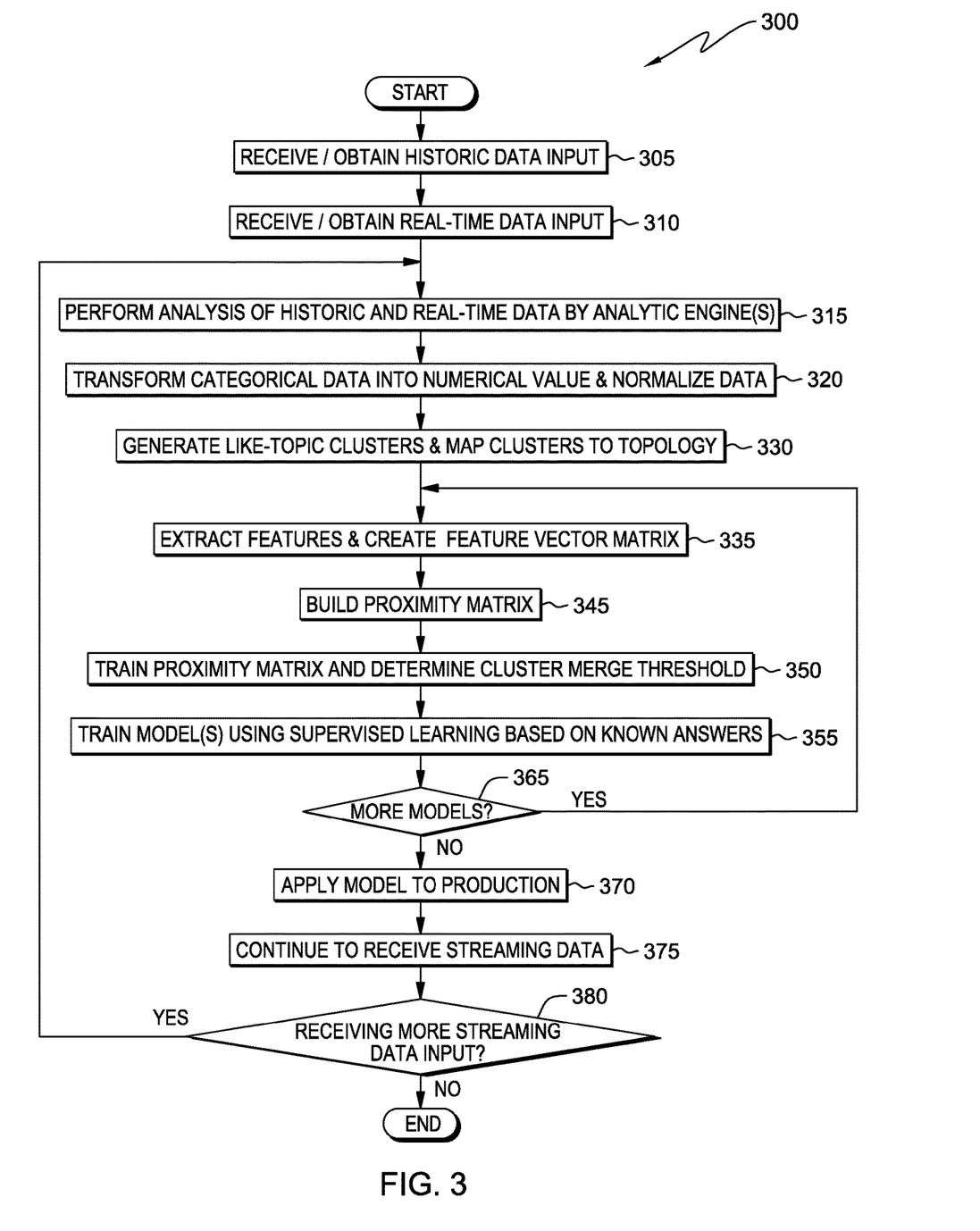
FIG. 3 illustrates operational steps of a resource location program, operating on a computing device within the data processing environment of FIG. 1, in accordance with an embodiment of the present invention.

FIG. 3 illustrates operational steps of resource location program 300, operating on computing device 110 within the data processing environment of FIG. 1, in accordance with an embodiment of the present invention. Resource locator program 300 receives historic data input (step 305). The historic data may include, for example, digitized text-based sources, such as books, articles, documents, published scientific papers, patents, and patent applications, which are accumulated to form a corpora of text data. Additionally, images, video, and audio data may be included in the input data to resource location program 300.

Resource locator program 300 also receives real-time data input (step 310). The real-time data may include, for example, data from sensors measuring current temperature at one or more locations, wind speed, humidity, weather conditions, or tidal conditions. Real-time data may also include social media communications related to aspects of one or more natural resources. For example, boats engaged in salmon fishing may be posting comments on social media sites containing information about current or recent success in location of salmon, or other characteristics of conditions that may contribute to locating salmon as a natural resource of food.

Having received the input of data associated with one or more natural resources, resource locator program 300 performs an analysis of the historic and real-time data using analytical engines (step 315). In one embodiment of the present invention, resource locator program 300 parses and performs analysis on the received data, determining the main subject or topic of data elements, and filtering out unnecessary and unrelated content. The analysis is performed on the historic and real-time data received by resource locator program 300, which may include, but is not limited to: digitized data from books, logs, journals, scientific studies, behavior studies, weather patterns and history, images, video, social media text and/or audio, sonar, radar, temperature readings, current weather data and predictions, moon phase, and ocean current data. may include, but is not limited to: digitized data from books, logs, journals, scientific studies, behavior studies, weather patterns and history, images, video, social media text and/or audio, sonar, radar, temperature readings, current weather data and predictions, moon phase, and ocean current data. may include, but is not limited to: digitized data from books, logs, journals, scientific studies, behavior studies, weather patterns and history, images, video, social media text and/or audio, sonar, radar, temperature readings, current weather data and predictions, moon phase, and ocean current data. Resource locator program 300 may use Natural Language Processing (NLP) techniques and tools to perform these actions, and may identify significant nouns, verbs, and modifiers that can be combined into meaningful subjects. Techniques such as singular value decomposition (SVD), applied to documents and text input data, may be applied to extract the principle components and summary of the input data. N-gram relations techniques may also be performed on the data to filter out content that is not related to the topic or subject.

Images are analyzed by object recognition programs and by performing analysis of metadata associated with the images, which may include annotations regarding location, time frame, and specific details found within the image. Similarly, video may be analyzed at the frame level or may analyze one frame out of a series of sequential frames. Audio data may be analyzed by use of speech recognition and the digitized result may be processed similar to the text data analysis described above.

To further analyze and compare the data, resource locator program 300 transforms categorical data into data having numerical values and which has been normalized (step 320). The numerical values may be qualitative, by indicating the relation to a topic, or may be ranked. Adding the numerical values and normalizing the data enables statistical and mathematical computations to be performed on the data. Cross-correlations of textual and multimedia data may be performed, as well as identifying and resolving anaphora topics and creating or including the topics in clusters. Normalization of the data prevents artificial significance resulting from modeling with combinations of data that may differ in their units of measure by orders of magnitude.

Resource locator program 300 generates like-topic clusters of data and maps the clusters of data to a topology (step 330). A cluster of data is formed from fragments of data that have been refined to descriptions of or about a particular subject matter. The descriptions are in terms of a set of features associated with a topic, summary, or subject matter. The features serve as characteristics making up the descriptions of the topic or subject matter. Thus, a multitude of descriptions with features are formed, and using any heuristic approach, like-topics or subject matters are grouped into clusters. In some cases it may make sense to create a hierarchy of groups, or simply separate groupings, forming natural clusters. Multiple clusters are formed, each having a central topic or subject matter, which differs in some way from another cluster.

For example, in a hypothetical case in which salmon is the natural resource sought after, analyzed input data may be clustered into groupings of historic salmon fishing locations, fishing logs, salmon behavior, current fishing condition, current ocean conditions, and communications from other fishing boats. Each of these may become a separate cluster of analyzed data, and may have central topics that support a hypothesis or "question" related to locating salmon.

By mapping the clusters of data to a topology, the data is represented in a similar context and comparisons of likeness and difference can be made. Main topics of clusters may be correlated with other clusters to determine how similar or different each cluster is to another cluster. The central topic or subject matter of a cluster may be used as a hypothesis or at least part of a hypothesis, and clusters may be agglomerated and hypothesis combined, based on how closely the subject matters or hypothesis are related.

The clusters include features that are characteristic of subject matter descriptions, and resource locator program 300 extracts the features and creates feature vectors, storing the vectors in a feature vector matrix (step 335). Features are associated with the description of various data in each cluster which supports a subject matter or hypothesis. As multiple characteristics are identified as features, the features are represented as feature vectors, possibly having a multitude of dimensions representing the multiple characteristics in the topology. Each cluster has features extracted and stored as feature vectors within a matrix structure, and the feature vectors serve as dimensions of evidence supporting a subject hypothesis, since the feature vectors can be traced back to descriptions of input data.

Having submitted the feature vectors as input to determine proximity of clusters, resource locator program 300 builds a proximity matrix (step 345). The feature vectors include numerical values associated with the mapping of the cluster they support within the topology. The similarity of feature vectors of different clusters are compared using proximity algorithms, and cluster features with proximity values indicating similarity to other clusters may be combined, and their respective hypothesis or subject matters are combined as well. Cluster combination is done in a hierarchical approach, and the corresponding cluster space is determined and may be scored using accuracy or quality measures.

The proximity matrix is used to determine which clusters of different data have a proximity which is close enough for the clusters to be further aggregated and the associated hypotheses combined. The proximity matrix is populated with feature vectors and the proximity distances are used in determining which clusters are combined.

Having built one or more proximity matrices of the initial models, resource location program 300 trains the proximity matrix and determines a cluster merge threshold (step 350). The initial training done using a proximity matrix is unsupervised, in which data is input and processed without knowing the expected output. Without access to data labels, the model looks for patterns in the data, and further clusters, and classifies data based on statistical analysis. Multiple iterations of unsupervised training are performed with scoring of the cluster space, keeping the best or most favorable result. The multiple features associated with a hypothesis may have a language model applied to the text of the features that gives a score based on the relevance to the hypothesis. Results of iterative unsupervised training can determine the significance of clusters and the cluster hypothesis by the supporting feature vector evidence, and can produce labels for clusters.

Determining the limit for the aggregation of clusters as well as those clusters that remain separate, creates the basis of a trained proximity matrix. To determine whether to keep clusters together or separate, a threshold of proximity is determined. The threshold that limits combining clusters is determined by scoring the favorable cluster space based on a metric, such as the overall accuracy of an experiment or a RAND index, for example. A RAND index or linear discriminate analysis may be used to tightly couple clusters or spread clusters out. A rand index is a measure of the similarity between two data clusters, and linear discriminate analysis finds a linear combination of features that can be used to separate or characterize two data clusters. The threshold is varied and cluster arrangements are iterated towards finding a best cluster space, which becomes the starting point of a model to be used to predict hypothesis probability.

Resource locator program 300 trains models using supervised learning based on known answers (step 355). The logistic regression models are trained using supervised learning in which the correct results are known. A sequence of multiple models, also referred to as a mixture of models or "experts", are used in a model graph structure, in which the feature vectors serve as dimensions of evidence and determine the route of model progression, in which case the output from a first model is the input for a second model, and so on. The final output generating probabilities of the hypothesis that can be, in one embodiment of the present invention, displayed as a heat map. Resource locator program 300 applies supervised learning to the best cluster space result of the unsupervised learning. To insure the best feature vectors, based on evidence having the highest confidence levels, are used for dimensions of evidence defining the routes of models, resource locator program 300 uses distributions of distributions of source data, processed by analytic engines to select the high probability feature vectors.

A set of hypothesis with known answers or target values is used, and the features associated with the hypothesis with known results are fed into the model. The desired output of the model is to match the known results of the hypothesis applied to the model. The error is determined and is used to adjust the beta values of the feature variables of the model. Adjustments are regularized and a Hilger space is added to the error term for each exemplar, which is the combination of a hypothesis and the features supporting the hypothesis, to avoid over-fitting of the model. The model is iterated, making adjustments to the model to achieve or approach the known resulting values, for each of multiple hypothesis and known values. In some cases, features of the model are added or removed and unsupervised and supervised learning is repeated until the model results are within an acceptable range of the known values. Resource locator program 300 makes use of another set of hypotheses and known results to test the model and determine when adequate training has been done and iteration of supervised learning end.

In one embodiment of the present invention, as an alternative to performing multiple iterations of unsupervised logistic regression training before performing a single iteration of supervised training, resource locator program 300 performs a combination of a pre-determined number of logistic regression training iterations followed by a pre-determined number of supervised learning iterations. For example, one or two iterations of unsupervised learning models may be performed followed by five to ten iterations of supervised learning, and then the process may be repeated multiple times.

Resource locator program 300, having completed an acceptable result for a model, checks to determine if more models are to be added and trained (decision step 365), and determining that additional models are to be added to existing trained models (step 365, "YES" branch), resource locators program 300 returns back to extract additional features and create an additional feature vector matrix (step 335), and proceeds as described above.

Determining that no additional models are to be added and trained to the existing model (step 365, "NO" branch), resource locator program 300 applies the trained model to a production environment (step 370). In a production environment, resource locator program receives input and determines the probability of various hypothesis with respect to the input received, processing the input through the routes of models, produces a result output, which in one embodiment of the present invention, is a heat map displaying probabilities as different colors or gray-scale shades, or isobars of a contour plot.

While the trained model performs in production, resource locator program 300 continues to receive streaming (real-time) data (step 375). The streaming data requires a fast pipeline to receive, process, and store the data. Data may be stored in a "sink", which may be a flat file, a database, or kept in random access memory (RAM), for example. The streaming data is used to update or generate feature vectors, updating the model. The model may require additional training iteration to assimilate updated or new feature vectors.

Resource locator program 300 determines if more streaming data input is being received (decision step 380), and determining that streaming data is not being received (step 380, "NO" branch), resource locator program ends. Determining that more streaming data is being received (step 380, "YES" branch), resource locator program 300 returns to perform analysis of real time data by analytic engines (step 315) based on the streaming data input, and proceed as described above to cluster data extract features and add or modify one or more proximity matrices and models.

Figure 4:
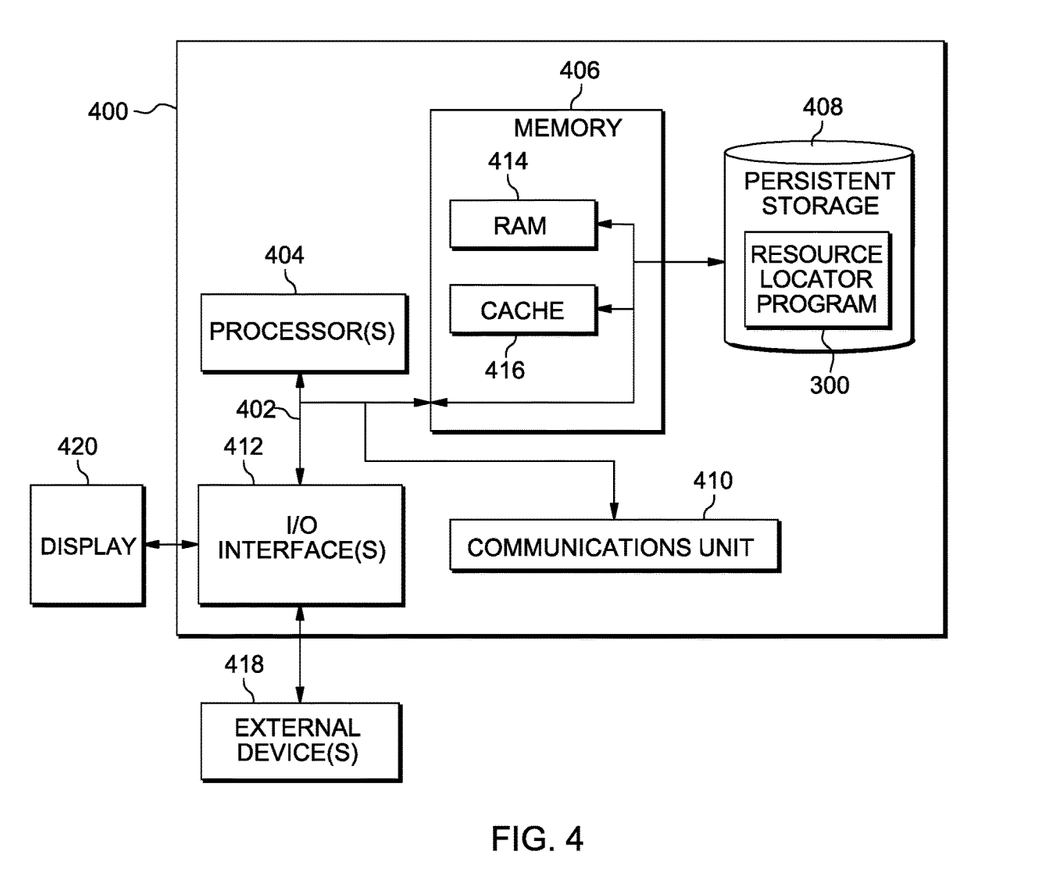
FIG. 4 depicts a block diagram of components of computing device 400, capable of operating resource locator program 300, in accordance with an illustrative embodiment of the present invention.

FIG. 4 depicts a block diagram of components of computing device 400 capable of operating resource locator program 300, in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 400 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer-readable storage media. In this embodiment, memory 406 includes random access memory (RAM) 414 and cache memory 416. In general, memory 406 can include any suitable volatile or non-volatile computer-readable storage media.

Resource locator program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer-readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Resource locator program 300 may be downloaded to persistent storage 408 through communications unit 410.

I/O interface(s) 412 allows for input and output of data with other devices that may be connected to computing device 110. For example, I/O interface 412 may provide a connection to external devices 418 such as a keyboard, keypad, a touch screen, and/or some other suitable input device. External devices 418 can also include portable computer-readable storage media such as, for example, thumb drives, portable optical or magnetic disks, and memory cards. Software and data used to practice embodiments of the present invention, e.g., resource locator program 300, can be stored on such portable computer-readable storage media and can be loaded onto persistent storage 408 via I/O interface(s) 412. I/O interface(s) 412 also connect to a display 420.

Display 420 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for predicting a location of a natural resource, the method comprising:

generating, by a computer processor, a topic-based dataset by filtering out non-topic related content received from a plurality of information sources based on N-gram techniques applied to the received content associated with known locations of a natural resource;

generating, by the computer processor, a plurality of clusters respectively including like-topic data of the received content, wherein features corresponding to characteristics of respective topics of the received content are extracted respectively;

storing, by the one or more processors, the features as feature vectors in a proximity matrix that includes applying a threshold of aggregation and separation of the clusters as determined by unsupervised learning, wherein a feature vector has one or more dimensions;

determining, by the one or more processors, a plurality of hypotheses respectively associated with a prediction of a particular location of the natural resource, the plurality of hypotheses respectively corresponding to the plurality of clusters of the like-topic data of the received content;

determining, by the computer processors, a confidence level of each hypothesis based on the respective feature vectors serving as dimensions of evidence of the confidence level;

generating, by the computer processor, a sequence of regression models based on groups of related features, in which respective regression models are based on the feature vectors stored in the proximity matrix corresponding to respective aggregate clusters; and identifying a particular predicted location of the natural resource associated with a highest probability hypothesis by processing the plurality of hypotheses through the sequence of the regression models.

2. The method of claim 1, wherein filtering of the non-topic related content received from the plurality of information sources includes applying singular value decomposition techniques.

3. The method of claim 1, further comprising;

annotating, by the computer processor, the topic-based dataset with numerical values, wherein data of the content of the like-topic data included in respective clusters are numerated;

normalizing the content of the like-topic data included in respective clusters, based on the numerical values as representations of the topic-based dataset; and generating a hypothesis probability based on the normalizing of the topic-based dataset.

4. The method of claim 1, wherein probabilities of natural resource location are associated with the feature vectors extracted from respective like-topic clusters of the content received from a plurality of information sources.

5. The method of claim 1, wherein a proximity function is applied to the proximity matrix to determine the threshold of separation or aggregation of like-topic clusters.

6. The method of claim 1, wherein, combining like-topic clusters includes combining hypotheses corresponding to the respective like-topic clusters combined.

7. The method of claim 1, wherein the plurality of information sources includes a combination of a historical data store and real time streaming of social media and technologically generated data.

8. The method of claim 1, wherein the topic-based dataset generated from the plurality of information sources includes multimedia data.

9. The method of claim 1, wherein the topic-based dataset is weighted based on respective beta distributions of the topic-based data.

10. The method of claim 1, further comprising:
generating, by the computer processor, one or more feature vectors from the one or more features of the plurality of clusters;
generating, by the computer processor, a plurality of cluster spaces, which include one or more pairs of clusters of the plurality of clusters that are combined, wherein each cluster space is based on a disparate threshold of similarity;
determining, by the computer processor, a cluster space of the plurality of cluster spaces that is favorable, based on a score of the cluster space and the disparate threshold of similarity; and
generating, by the computer processor, one or more proximity matrices from the one or more features vectors, based on the cluster space that is favorable.

11. The method of claim 10, wherein determining the cluster space that is favorable further comprises:
determining, by the computer processor, a limit of combining clusters of the plurality of clusters based on the disparate threshold of similarity which produces the score of the cluster space that is favorable.

12. The method of claim 1, wherein generating a sequence of regression models associated with a location of the natural resource, further comprises:
training, by the computer processor, the sequence of regression models based on successive refinement of supervised learning, wherein the sequence of models is based, at least in part, on the feature vectors of the one or more proximity matrices.

13. The method of claim 1, wherein an output of a first model of the sequence of regression models is used as input to a second model of the sequence of regression models.

14. The method of claim 1, further comprising:
determining, by the computer processor, a route through the sequence of models for each hypothesis of the plurality of hypotheses, based on dimensions of evidence, wherein the dimensions of evidence include groupings of the one or more features.

15. The method of claim 1, further comprising:
representing, by the computer processor, the plurality of probabilities respectively corresponding to the validity of each hypothesis of the plurality of hypotheses as a heat map, wherein a first element of the heat map corresponds to a first probability of a hypothesis of the plurality of hypotheses, and disparate from a second element of the heat map corresponding to a second probability of a hypothesis of the plurality of hypotheses.

16. A computer program product for locating a natural resource, the computer program product comprising:
a non-transitory computer readable storage medium having program instructions embodied therewith, the program instructions executable by a computer processor to cause the computer processor to perform a method comprising:
generating, by a computer processor, a topic-based dataset by filtering out non-topic related content received from a plurality of information sources based on N-gram techniques applied to the received content associated with known locations of a natural resource;
generating, by the computer processor, a plurality of clusters respectively including like-topic data of the received content, wherein features corresponding to characteristics of respective topics of the received content are extracted respectively;
storing, by the one or more processors, the features as feature vectors in a proximity matrix that includes applying a threshold of aggregation and separation of the clusters as determined by unsupervised learning, wherein a feature vector has one or more dimensions;
determining, by the one or more processors, a plurality of hypotheses respectively associated with a prediction of a particular location of the natural resource, the plurality of hypotheses respectively corresponding to the plurality of clusters of the like-topic data of the received content;
determining, by the computer processors, a confidence level of each hypothesis based on the respective feature vectors serving as dimensions of evidence of the confidence level;
generating, by the computer processor, a sequence of regression models based on groups of related features, in which respective regression models are based on the feature vectors stored in the proximity matrix corresponding to respective aggregate clusters; and
identifying a particular predicted location of the natural resource associated with a highest probability hypothesis by processing the plurality of hypotheses through the sequence of the regression models.

17. The computer program product of claim 16, further comprising:
annotating, by the computer processor, the topic-based dataset with numerical values, wherein data of the content of the like-topic data included in respective clusters are numerated;
normalizing the content of the like-topic data included in respective clusters, based on the numerical values as representations of the topic-based dataset; and
generating a hypothesis probability based on the normalizing of the topic-based dataset.

18. The computer program product of claim 16, wherein generating a sequence of regression models associated with a location of the natural resource, further comprises:
training, by the computer processor, the sequence of regression models based on successive refinement of supervised learning, wherein the sequence of models is based, at least in part, on the feature vectors of the one or more proximity matrices.

19. The computer program product of claim 16, further comprising:

determining, by the computer processor, a route through the sequence of models for each hypothesis of the plurality of hypotheses, based on dimensions of evidence, wherein the dimensions of evidence include groupings of the one or more features.

20. A computer system for locating a natural resource, the computer system comprising:

one or more computer processors;

one or more computer readable storage media;

program instructions stored on the computer readable storage media for execution by at least one of the one or more processors, the program instructions comprising:

program instructions to generate a topic-based dataset by filtering out non-topic related content received from a plurality of information sources based on N-gram techniques applied to the received content associated with known locations of a natural resource;

program instructions to generate a plurality of clusters respectively including like-topic data of the received content, wherein features corresponding to characteristics of respective topics of the received content are extracted respectively;

program instructions to store the features as feature vectors in a proximity matrix that includes applying a threshold of aggregation and separation of the clusters as determined by unsupervised learning, wherein a feature vector has one or more dimensions;

program instructions to determine a plurality of hypotheses respectively associated with a prediction of a particular location of the natural resource, the plurality of hypotheses respectively corresponding to the plurality of clusters of the like-topic data of the received content;

program instructions to determine a confidence level of each hypothesis based on the respective feature vectors serving as dimensions of evidence of the confidence level;

program instructions to generate a sequence of regression models based on groups of related features, in which respective regression models are based on the feature vectors stored in the proximity matrix corresponding to respective aggregate clusters; and         program instructions to identify a particular predicted location of the natural resource associated with a highest probability hypothesis by processing the plurality of hypotheses through the sequence of the regression models.

\* \* \* \* \*